United States Patent [19]

Langer

[11] 3,717,816

[45] Feb. 20, 1973

[54] IMPULSE-SCANNED N-PATH FILTER FOR SEVERAL FREQUENCY RANGES

[75] Inventor: Erik Langer, Munich, Germany

[73] Assignee: Siemens Aktiengesellschaft, Berlin and Munich, Germany

[22] Filed: March 19, 1971

[21] Appl. No.: 126,328

Related U.S. Application Data

[63] Continuation of Ser. No. 758,421, Sept. 9, 1968, abandoned.

[52] U.S. Cl.....................................325/430, 325/442

[51] Int. Cl.................................................H04b 1/27

[58] Field of Search..........179/15 AA; 307/233, 271; 325/430, 431, 437, 442, 477; 328/16, 17, 18, 138, 153, 167; 333/6, 70; 343/206

[56] References Cited

UNITED STATES PATENTS

| | | | |
|---|---|---|---|
| 3,399,278 | 8/1968 | Dahlman | 179/15 |
| 2,584,986 | 2/1952 | Clark | 328/138 |
| 3,462,554 | 8/1969 | Steel, Jr. | 343/206 |
| 3,359,370 | 12/1967 | Dahlman et al. | 179/15 |
| 3,414,821 | 12/1968 | Bickers et al. | 325/437 |
| 3,445,685 | 5/1969 | Roth | 307/233 |
| 3,205,310 | 9/1965 | Schlichte | 179/15 |

*Primary Examiner*—Robert L. Griffin
*Assistant Examiner*—Barry Leibowitz
*Attorney*—Hill, Sherman, Meroni, Gross & Simpson

[57] ABSTRACT

The use of N-path filters for converting a frequency to a lower frequency range is disclosed. The invention allows selectivity and frequency conversion. The arrangement according to this invention may be used as a secondary intermediate frequency stage of a double superhetrodyne receiver, for example. It may also be used as a selective multiple converter.

3 Claims, 3 Drawing Figures

Fig.1
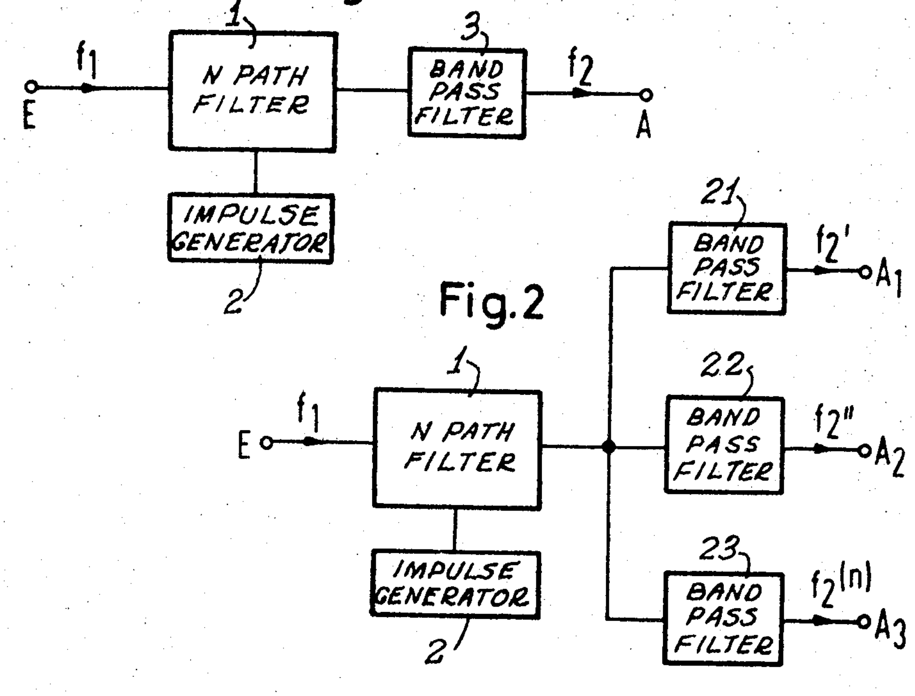
Fig.2
Fig.3
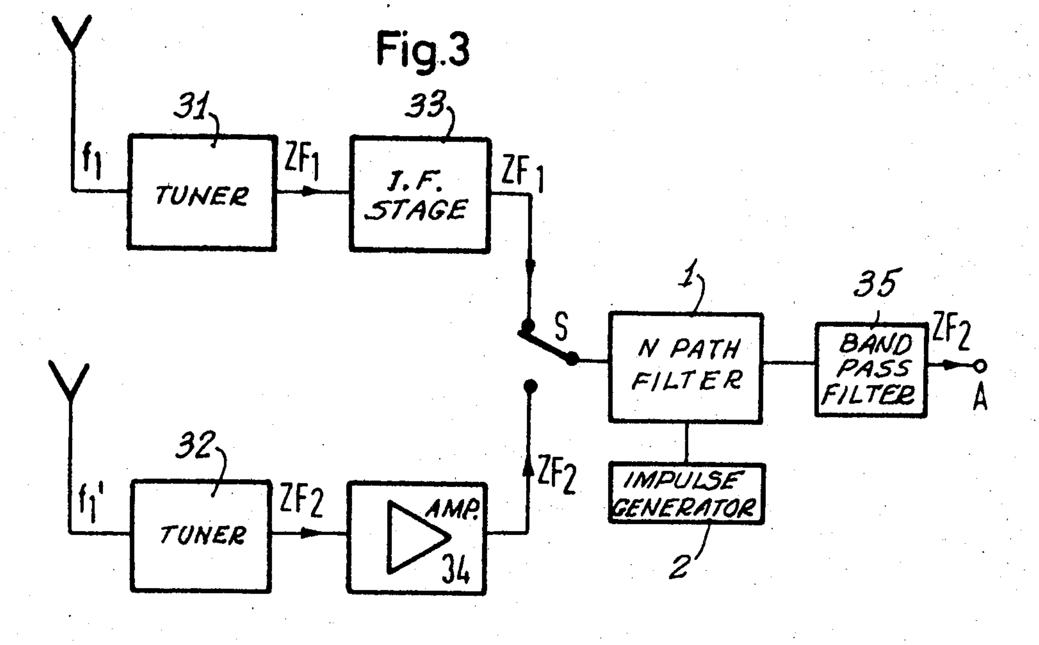
INVENTOR
Erik Langer
BY Hill, Sherman, Meroni, Gross & Simpson
ATTYS.

IMPULSE-SCANNED N-PATH FILTER FOR SEVERAL FREQUENCY RANGES

RELATED APPLICATIONS

This application is a continuation of application Ser. No. 758,421 filed 9/9/68 now abandoned.

BACKGROUND OF THE INVENTION

This invention relates in general to frequency selective systems and in particular to the use of impulse-switched N-Path filters.

DESCRIPTION OF THE PRIOR ART

N-Path filters are disclosed and described in the Article entitled "Time Multiplex Methods for Filter Syntheses" appearing in the magazine "Frequenz" (Frequency) volume 20/1966 No. 12, pages 397 to 406. Such filters deliver a signal at the output which is an integral multiple (including submultiples) of the input signal multiplied by the switching frequency. If the input frequency is approximately equal to the switching frequency ($f_o$), at the output of the N-Path filter components with frequencies of $f_o$, $2f_o$, $3f_o$, . . . $K_1.f_o$. will be present. Those frequencies for which the factor $K_1$ is equal to the number N of the filter paths or becomes a multiple thereof will not appear in the output signal.

In the prior art, N-Path filters have not been considered for transposing input signals into higher and lower frequency ranges.

Translated from the German language and presented in its entirety, the Article referred to above as having appeared in the magazine "Frequenz" is as follows:

For the synthesis of inductor-less filters in integrated circuits a number of active R-C networks have become known; of these the N-channel time-division multiplex method deserves particular attention. The digital arrangements known as N-Path-Filters require quite a lot of mathematical effort if deep insight is to be gained. Using the resources of the Laplace transforms and Function-theory the author has attempted to derive the principal electrical transfer characteristics of such systems in a lucid form, and to discuss the formulas obtained in terms of microelectronics. For the N-Path-parallel-switch configuration which holds particular promise the design formulas found are evaluated and the fundamental differences from L-C filters explained.

Since the beginning of the new electrical technology, filter networks are firmly linked with the terms inductance, capacitance and resistance in the minds of engineers. We find arrangements of more or less complexity of these three basic components in each transmission system, either as passive or as non-passive circuits. However, advancement of miniaturization of the electronic devices was retarded because inductances became a bottleneck in the design of circuits because their dimensions could not be decreased as those of the other resistive and capacitive elements while maintaining the required electrical properties. Micro-miniaturization based on solid-state and thin-film techniques required that electromagnetic switching elements be eliminated. Such production method techniques were at first suitable only for digital switching networks which can be constructed in many instances with transistors, diodes and resistors. However, "integrated circuit networks" of the future require that the inductances be replaced by other devices. The following possibilities exist:

*a*. Reactance circuits formed with transistors. These are applicable only in over a relatively narrow frequency range and high quality is difficult to obtain.

*b*. Gyrator circuits using transistors. These are suitable only for fixed frequencies.

*c*. Negative-impedance converters (NIC). These are suitable only for fixed frequencies. Four-pole arrangements having desired filter-circuit characteristics may be considered. These are:

*d*. Electro-mechanic filters. Suitable only for fixed frequencies and have relatively large dimensions as compared with micro-electronic circuits.

*e*. Piezo-electric filters. Fixed frequency and have side resonances which are difficult to eliminate.

*f*. RC bridge filters using inverse feedback or differential amplifiers.

*g*. Scanning method using delay filters and N-path filters.

Systems listed under *g*) are considered in this study. These devices may prove very important in obtaining frequency-selective integrated switching networks (IC). Although they have been known in principle for years [1] . . . [4], N-path filters have become of particular interest in connection with IC's, however, up to the present this method has developed slowly. The reason for this is probably that the theory of such networks is often not easily accessible for practical engineers and physicists. The command of mathematical techniques not commonly known to practical engineers is needed for its understanding. For this reason, a short mathematical introduction is included in this description of N-path filters so as to make this somewhat dry material more accessible to the practical engineer. An increase of the understanding of the theoretical principles is the goal of this essay. 1. Mathematic expedients:

The relationship between the time response and the frequency characteristic of an electrical network is described by mathematic transformations, such as Fourier-transformations. Calculations using logarithms or complex alternating-current calculations are also transformations although we are hardly aware of this fact when we apply them.

The complex form of the Fourier transformation is more suitable for the circuits discussed here since the conversion to the Laplace transformation can be easily made.

The relationship between a time function $u$ ($t$) and its spectral function $U$ ($j$ $w$), may be written as follows:

$$U(j\omega)=\int_{-\infty}^{+\infty} u(t)e^{j\omega t}dt=F\{u(t)\} \qquad (1.1)$$

With the inverse transformation formula:

$$u(l)=\frac{1}{2\pi}\int_{-\infty}^{+\infty} U(j\omega)e^{j\omega t}d\omega=F^{-1}\{U(j\omega)\} \qquad (1.2)$$

in which $\omega_o$ T = $2\pi$ determines the relationship between period and the basic frequency assigned to it.

With these terms, the transmission function $G$ ($j$ $w$) of a network can be defined to be that complex factor by which the spectral function $U_1(jw)$ of an input magnitude $u_1(t)$ must be multiplied in order to obtain the spectral function $U_2(jw)$ of the output magnitude $u_2(t)$ $$U_2(j\omega)=U_1(j\omega)\cdot G(j\omega) \quad (1.3)$$

However, the treatment of the above problem with the Fourier transformation alone will meet with difficulties since the integral $\{u(l)\}$ of most of the functions which are here of interest do not converge. The Laplace transformation which leads to the convergence of the transformation integral with the help of a damping factor, is a more useful method for network calculations. However, this is also not without difficulty, since the Laplace integrals can possibly only be inverted by the use of the function theory such as the residue set theorem [5], [6].

In order to understand the following sections, the following relationships are defined here:

$$L\{f(t)\}=F(s)=\int_0^{\infty} e^{-st}f(t)dt \quad (1.4)$$

Laplace transformation $$f(t)=L^{-1}\{F(s)\}=\frac{1}{2\pi j}\int_{a-j\infty}^{a+j\infty} e^{st}F(s)ds \quad (1.5)$$

Inverse Laplace Transformation $s=a+jw$ is a complex variable with a real portion $a$ which must be selected in such a way that the integral converges. Thus there exists the correspondence $f(l)\odot\!\longrightarrow\!\bigcirc F(s)$.

Corresponding to the general usage, the functions of the time domain are symbolized by small letters and those of the spectral domain by capital letters. By means of the folding set, the product of two functions of the complex domain are related to the upper domain:

$$F_1(s)\cdot F_2(s)\odot\!\longleftarrow\!\bigcirc f_1(t)*f_2(t)=\int_0^t f_1(\tau)\cdot f_2(t-\tau)d\tau \quad (1.6)$$

The integration is effected via the continuous variable $\tau$, while the variable $t$ is regarded as a parameter. The shifting set of the complex domain is furthermore of particular importance:

$$f(t)\cdot e^{-at}\odot\!\longleftarrow\!\bigcirc F(s+a)$$

or $$f(t)\cdot e^{-at}\odot\!\longleftarrow\!\bigcirc F(s-a) \quad (1.7)$$

and the operation of the complex "folding" which illustrates the product of two time functions of the upper domain in the complex domain:

$$f_1(t)\cdot f_2(t)\bigcirc\!\longleftarrow\!\odot\begin{cases}\frac{1}{2\pi j}\int_{a-j\infty}^{a+j\infty}F_1(\sigma)\cdot F_2(s-\sigma)d\sigma\\ \text{or}\\ \frac{1}{2\pi j}\int_{a-j\infty}^{a+j\infty}F_1(s-\sigma)\cdot F_2(\sigma)d\sigma\end{cases}$$

whereby $\alpha$ again is selected in such a way that the integrals converge. The integral expressions right of the brace are generally illustrated by the operational symbol $\otimes$.

$$L\{f_1(t)\cdot f_2(t)\}=F_1(s)\otimes F_2(s) \quad (1.9)$$

The calculation of the folding integral, however, can be avoided if one of the two spectral functions $F_1(s)$ or $F_2(s$ is rational, has more poles than zero points and if the denominator polynominal has only 2 simple zero points. In this special case which here is important, the folding integral can be expressed with the help of the Heaviside expansion theorem and the "shifting theorem" by means of a polynominal: With $f_1(s)=Z(s)/N(s)$, $$f_1(t)=L^{-1}\left\{\frac{Z(s)}{N(s)}\right\}=\sum\frac{Z(s_1)}{N'(s_1)}\cdot e^{s_r t} \quad (1.10)$$

is obtained, whereby $Z(s_r)$ represents the value of the numerator at the point $s=s_r$ $N'(s_r)$ is the first derivative of the denominator polynominal of the variable $s$. The relationship $$L\{f_2(t)\cdot e^{s_r t}\}=F_2(s-s_r) \quad (1.11)$$

gives:

$$F_1(s)\otimes F_2(s)=\sum_{v}\frac{Z(s_v)}{N'(s_v)}\cdot F_2(s-s_v) \quad (1.12)$$

In this form, complex folding is applied in the following paragraphs.

2. N-Path Filters:

Signal-scanning methods have been common in technology for many years. The pulse-code modulation, sampling oscillographs and various color television and stereophonic transmission methods [7] are common examples. Linvill [1], and other authors [2], [3], [4], and [8], pointed out a long time ago the possibility of simulating band-pass characteristics with the periodic switches. Mertz and Gray [9] showed in 1934 that the spectrum of periodically-scanned alternate currents group symmetrically around the harmonics of the scanning frequency. It was later recognized that commutated networks were usable only for certain spectrum ranges. Such an arrangement consists essentially of two synchronously rotating switches with low pass filters between them. There are as many low passes as there are contact pairs for the switches.

Picture 1.

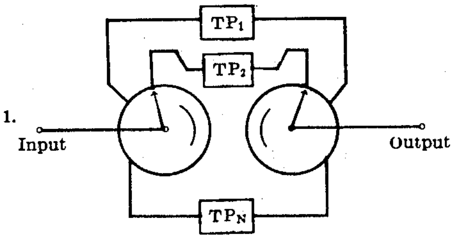

N Switching Positions, N Low Passes

Circuit Diagram in Principle of an N-path Filter.

It is to be noted that s system with mechanical switches would only be possible for low-frequency applications. For higher frequencies, the replacement of the mechanical switches by electronic means is necessary. Mathematics show that it is possible to generalize the circuit analysis since special forms of the switching function may have important practical consequences at times.

In order to find the transformation factor of a network which is modified in this way, one must thus examine, first of all, how an input signal is deformed by the network. In mathematical terms this means that the time function of the input signal of each of the N channels must be multiplied with the time function of the first switch, must then be evaluated with the low pass, and finally must be multiplied with the time function of the second switch. The output signals of the N channels are finally summarized. The following derivations are constructed on this mathematic operation plan.

If one now regards the following special arrangement, consisting of the multiplicative modulators $M_{1n}$, and $M_{2n}$the N passive quadrupole with the impulse reply h(t) and a pulse generator with the frequency $l_0 = 1/t$ for the control of the modulators.

Picture 2.

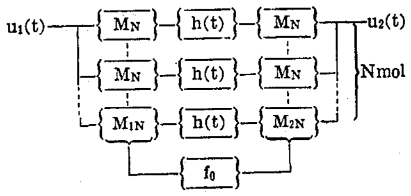

Block Circuit Diagram of an Electronic N-Path Filter.

The only requirement for the modulators $M_{1n}$ and $M_{2n}$ is that they be synchronously controlled and that the control signals from channel to channel are respectively displaced with regard to one another over the time interval $\tau = T/N$.

If, for instance, the control signal would have the shape of square-wave impulses, the following signal scheme would result.

Picture 3.

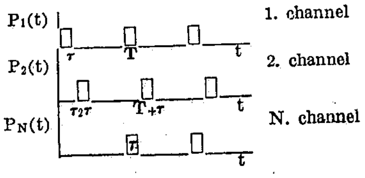

Period Duration $T$; Impulse Duration $\tau = T/N$

Chronological Succession of the Modulation Impulses.

The modulation is thus effected in the rhythm of the time functions:

$$p_n(t) = p[t-(n-1)\tau] = \sum_{\alpha=-\infty}^{+\infty} P_\alpha \cdot e^{j\omega_0\alpha[t-(n-1)\tau]} \quad (2.1)$$

and $$q_n(t) = q[t-(n-1)\tau] = \sum_{\beta=-\infty}^{+\infty} Q_\beta \cdot e^{j\omega_0\beta[t-(n-1)\tau]} \quad (2.2)$$

The time functions and coefficients $P_\alpha$ and $Q_\beta$ have not as yet been discussed. In the calculation it will develop that a suitable selection of $P_\alpha$ and $Q_\beta$ can result in desirable transfer functions of the filter. The illustration of the switching functions by complex Fourier sets is particularly advantageous for further mathematical treatment.

The initial voltage $u_2(t)$ of the network according to Picture 2 is equal to the input voltage $u_1(t)$ which is evaluated with the functions $P_n(t)$, $q_n(t)$ and $h(t)$, summarized over all N channels with the help of (1.6).

$$u_2(t) = \sum_{n=1}^{N} q_n(t) \cdot [h(t) * (p_n(t) \cdot u_1(t))] \quad (2.3)$$

Since it is mainly the frequency behavior of the arrangement that is of interest, it is advantageous to transform the problem into the complex domain. For this, the process can be divided into two steps:

$$u_2(t) = \sum_{n=1}^{N} v_n(t) \cdot q_n(t) \quad (2.4)$$

whereby $$v_n(t) = (u_1(t) \cdot p_n(t)) * h(t) \quad (2.5)$$

The equation (2.4) contains the product of two time functions. The Laplace transformation of such an expression is effected according to the rules of the complex convolution (1.9):

$$U_2(s) = \sum_{n=1}^{N} V_n(s) \otimes Q_n(s) \quad (2.6)$$

If one assumes that $h(t)$ is not passive but also time-independent (thus has constant parameters), the complex convolution law can also be applied to (2.5):

$$V_n(s) = [U_1(s) \otimes P_n(s)] \cdot H(s) \quad (2.7)$$

The convolution in this case is particularly simple, since $U_1(s)$ and $P_n(s)$ are sums of exponential functions (see equations (2.1) and (2.2). With the help of the correspondence of (1.7) or (1.11), one obtains for $$y(t) = e^{j\omega_0 t} \cdot u_1(t) \quad \bullet\!\!-\!\!\circ \quad Y(s) = U_1(s - j\omega_0) \quad (2.8)$$

and finally for (2.7), while applying (2.1) and (1.12):

$$V_n(s) = \sum_{\alpha=-\infty}^{+\infty} P_\alpha \cdot e^{-j\omega_0\alpha(n-1)T} \cdot U_1(s - j\omega_0\alpha) \cdot H(s) \quad (2.9)$$

whereby the desintegration $$e^{j\omega_0\alpha[t-(n-1)T]} = e^{j\omega_0\alpha t} \cdot e^{-j\omega_0\alpha(n-1)T}$$

had been effected (compare Appendix 1).

If the rules (1.7) and 1.12) are now also applied to (2.6), there will be found for $$U_2(s) = \sum_N \sum_\alpha \sum_\beta P_\alpha \cdot Q_\beta \cdot e^{-j\omega_0(\alpha+\beta)(n-1)T} \times U_1[s - j\omega_0(\alpha+\beta)] \cdot H(s - j\omega_0\beta) \quad (2.10)$$

From this expression, the exponential term is first to be closer examined.

$$\sum_{n=1}^{N} e^{-j\omega_0(\alpha+\beta)(n-1)T}$$

is the sum of a geometric set with a member quotient of $$e^{-j\omega_0(\alpha+\beta)T}.$$

With $\omega_0 = 2\pi/T$ and $\tau = T/N$, $$\sum_{n=1}^{N} e^{-j\omega_0(\alpha+\beta)(n-1)T} = N \quad (2.11)$$

for all $$\alpha+\beta = k \cdot N \quad k = \pm 1, \pm 2, \pm 3, \ldots \quad (2.12)$$

while the sum for $\alpha + \beta \neq kN$ is identical to zero (see Appendix 2). Thus, only those members in (2.10) are of interest for which $\alpha + \beta$ is an integral multiple of the channel number. This fact is of great importance for the further evaluation of the expression (2.10). With (2.11) and (2.12), an essentially more simple formula can be written for (2.10):

$$U_2(s) = N \times \sum_g \sum_k P_{kN-\beta} \cdot O_\beta \cdot U_1(s - j\omega_0 kN) \cdot H(s - j\omega_0 \beta). \qquad (2.13)$$

The summation over $\alpha$ has been replaced by the summation over $k$ due to $$\alpha = kN - \beta \qquad (2.14)$$

However, since one still has to summarize over two subcripts which are independent from one another, the spectrum of $u_2$ obtains many terms which overlap. If, however, a low pass filter is arranged at the inlet with the basic frequency $\omega_2 = (N\,\omega_o)/2$, all members for $k \neq 0$ are exempted in (2.13). This is due to the fact that only for $k = 0$, the expression is $\omega_o k\, N < (N\,\omega_o)/2$ in the factor $U_1[s - j\,\omega_o\, kW]$; *for all other k*, the spectral portions would lie in the suppression band of the low pass. If, furthermore, a broad-band pass is added at the outlet of the N-path filter, with a center frequency of $w_o$ with the lower cut-off frequency $\omega_t \geqq \omega_o/2$ and the upper cut-off frequency of $\omega\pi \leqq 3\omega_o/2$, then all members for $\beta \pm 1$ will be eliminated. The output spectrum then does not contain any overlapping terms and a clear relation between the spectra of the input voltage and the output voltage can be discovered namely $$\frac{U_2(s)}{U_1(s)} = N[P_{-1}Q_1 \cdot H(s - j\omega_0) + P_1 Q_{-1} H(s + j\omega_0)] \qquad (2.15)$$

This expression, however, is nothing other than the transfer function $G(s)$ of the N-path network and its frequency response is determined by the quadrupole $H(s)$ and the modulator frequency $w_o$. The spectral lines are grouped around $w_o$ as center band frequency, and the band width of the passage range depends on the cut-off frequency of the quadrupole $H(s)$. If this quadrupole $H(s)$ is, in particular, a low pass with the center frequency $w_1$, then (2.15) can also be regarded as a low-pass band-pass transformation.

Picture 4.

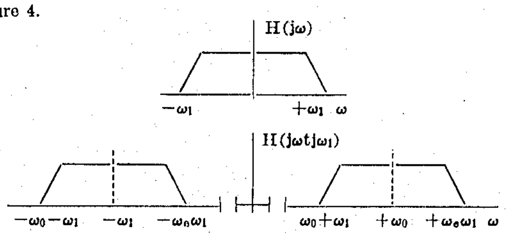

Frequency of $H(j\omega)$ and $H(j\omega \pm j\omega_0)$.

The discovery is that the center frequency of the so-simulated band pass is only a function of the modulator frequency $w_o$ and is independent of the tolerances and instabilities of the remaining components of the network. It should still be clarified what the influence of the curve shape of the modulator voltages and the number of channels N is on the transformation properties. Equation (2.15) shows that both the channel number N and the curve shape of the modulation voltages comply with the attenuation of the network. Two special cases are of particular interest, nwmely sine-shaped and rectangular-shaped modulator voltages:

a. Sine Modulation

The coefficient formula of the complex Fourier development gives:

$$p_n(t) = q_n(t) = A \sin \omega_0 t A \ . \ . \ .$$

Amplitude of the modulator voltage $$P_\alpha = Q_\alpha = \frac{1}{T}\int_0^T A \sin \omega_v t \cdot e^{-j\omega_0 \alpha t} = \begin{cases} -\frac{j}{2} A \text{ für } \alpha = +1 \\ +\frac{j}{2} A \text{ für } \alpha = -1 \end{cases} \qquad (2.16)$$

This result, if inserted into (2.15) leads to $$G(s) = \frac{U_2(s)}{U_1(s)} = N\left[\frac{A^2}{4} \cdot H(s - j\omega_0) + \frac{A^2}{4} \cdot H(s + j\omega_0)\right]. \qquad (2.17)$$

The output voltage thus is directly proportional N, i.e. the attenuation of the N-path network is in this case inversely proportional to the number of paths. With sinusoidal modulation, furthermore all $$P_\alpha \equiv 0 \text{ für } \alpha \neq \pm 1$$
$$Q_\beta \equiv 0 \text{ für } \beta \neq \pm 1 \qquad (2.18)$$

i.e., all $P_{kN-\beta} \cdot Q_\beta \equiv 0$ for $k \neq 0$.

Thus, one reaches the transformation function (2.15) or (2.17) without the band limits which are switched ahead or behind on the load side. Furthermore, this is a special case with which a low-pass band-pass transformation is possible with two channels (the modulator voltages of the two channels are then phase-shifted with regard to one another over 90°). This variation, however, is not suited for integrated circuits in spite of its simplicity because with these techniques it is difficult to obtain matched modulators.

*b*. Rectangular Modulation

This form of modulation is of particular importance since the modulators are replaced by simple gate circuits. The gates then have the switching frequency $w_o = 2\pi/T$, the closed period $\tau = I/N$ and the passage times are shifted with regard to one another from channel to channel as shown in Picture 2.

The gates thus correspond to the time functions $$P_n(t) = 1 \text{ für } (n-1)r + (v-1)T \leqq t \leqq nr + (r-1)Tv = 1, 2, 3, \ldots \qquad (2.19)$$

otherwise $P_n(t) \equiv 0$. $Q_n(t)$ may be similarly obtained. For the determination of the Fourier coefficients $P\,\alpha$ and $Q\,\beta$, integrals of the type $$P_\alpha = \frac{1}{T}\int_0^1 p(t) \cdot c^{-j\omega_0 \alpha t} dt \qquad (2.20)$$

have to be solved (see Appendix 3).

The solution gives the relationship:

$$P_\alpha = e^{-1\frac{\alpha\pi}{N}} \cdot \frac{\sin\frac{\alpha\pi}{N}}{\alpha\pi}$$

$$Q_\beta = e^{-1\frac{\beta\pi}{N}} \cdot \frac{\sin\frac{\beta\pi}{N}}{\beta\pi} \qquad (2.21)$$

and the following result:

$$P_{-1}\cdot Q_1 = \frac{\sin^2\frac{\pi}{N}}{\pi^2}\cdot P_1 Q_{-1} = \frac{\sin^2\frac{\pi}{N}}{\pi^2} \qquad (2.22)$$

These expressions inserted in (2.15) result in:

$$G(s) = \frac{U_2(s)}{U_1(s)} = N\left[\frac{\sin^2\frac{\pi}{N}}{\pi^2}\cdot H(s-j\omega_0) + \frac{\sin^2\frac{\pi}{N}}{\pi^2}\cdot H(s+j\omega_0)\right] = N\,\frac{\sin^2\frac{\pi}{N}}{\pi^2}\,[H(s-j\omega_0)+H(s+j\omega_0)] \qquad (2.23)$$

The attenuation of the network is thus linked to the channel number N by the factor $$\gamma_N = N\,\frac{\sin^2\frac{\pi}{N}}{\pi^2} \qquad (2.24)$$

For $N=2$ ist $\gamma_2=\frac{2}{\pi^2}$ and for $N=3\gamma_3=\frac{9}{4\pi^2}$ and finally the limiting value for infinite channel number $$\lim_{N\to\infty}\gamma_N = 0.$$

The course of $\gamma N$ shows that the maximum output voltage is reached with $N=3$. This is also the minimum number of channels for the non-sine-shaped modulator control. The upper center frequency of the two additional filters was $\omega_d \leq (N\omega_o)/2$ (2.25) in order to avoid ambiguities. However, on the other hand, the filters are supposed to pass input frequencies in the vicinity of $w_o$, $N \geq 3$.

Picture 5.

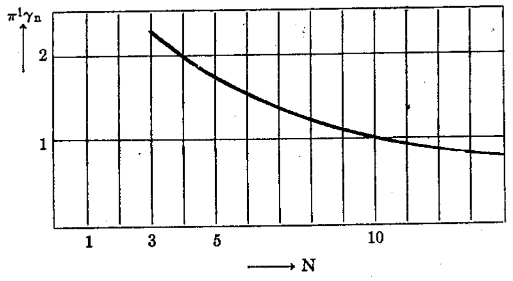

Voltage Transformation of the N-Path Filter According to Picture 2 as a Function of the Number of Channels N.

According to the curve of the attenuation of $H(jw)$, band width and blockage attenuation of the N-path network can be selected. Due to the low-pass band-pass transformation, a function $H(jw)$ can be formed with very simple RC networks, and this function produces band-pass characteristics $H(jw - jw_o)$ with relatively steep flanks. The absolute band width of the band pass is only dependent upon the absolute band width of $H(jw)$ and entirely independent from the center frequency $w_o$. This allows the synthesis of very narrow-band filters up to carrier frequencies of several MHz, which can be tuned only on the stability of the switching frequency $w_o$. The latter, however, can be kept very constant, for instance, with the help of crystals. The transformation curve of such a narrow-band filter is derived from (2.23) by allowing the real portion $\alpha$ of the complex variable $s=\alpha+jw$ approach zero:

$$G(s)\to G(j\omega)$$

$$G(j\omega) = \frac{U_2(j\omega)}{U_1(j\omega)} = N\,\frac{\sin^2\frac{\pi}{N}}{\pi^2}\,[H(j\omega-j\omega_0)+H(j\omega+j\omega_0)] \qquad (2.26)$$

The frequency path is thus fixed by the expression whereby only one term must be regarded due to the symmetry with regard to the real axis. For instance, if $$H(j\omega) = \frac{\frac{1}{j\omega C}}{R+\frac{1}{j\omega C}} \qquad (2.27)$$

is a simple RC low-pass member with the basic frequency $f_g w_g = 1/RC$ there will result:

$$|H(j\omega)| = \left|\frac{1}{j\omega RC+1}\right| = \frac{\pm 1}{\sqrt{\omega^2R^2C^2+1}} = \frac{\pm 1}{\sqrt{\left(\frac{\omega}{\omega_g}\right)^2+1}} \qquad (2.28)$$

and $$|H(j\omega-j\omega_0)| = \frac{\pm 1}{\sqrt{(\omega-\omega_0)^2R^2C^2+1}} = \frac{\pm 1}{\sqrt{\left(\frac{\omega_2-\omega_0}{\omega_g}\right)^2+1}} \qquad (2.29)$$

With the assumptions $f_o$ = 1 MHz, $f_g$ = 1 kHz, the passage curve is obtained which is illustrated in Picture 6. The curve is symmetrical to $w_o$ or $f_o$, and it clearly differs from the transformation characteristic of the LC-filters.

Picture 6.

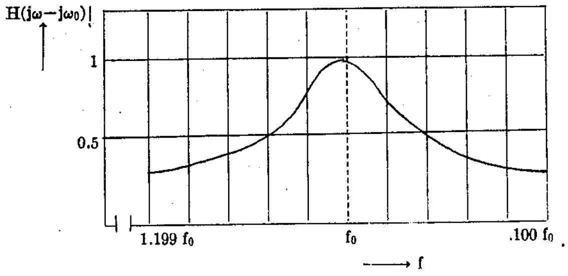

Selection Curve of an N-Path Filter With One Section RC Low Pass $H(jw)$.

The *db* band width there is 2 kHz, which corresponds to a factor of merit of 500 (1). Since the absolute band width is independent from the center frequency, the apparent factor of merit increases linearly with it. This is also an advantage as compared to LC oscillator circuits. If the basic frequency of $H(jw)$ is sufficiently low, such as $$\omega_g \leqq N\omega_o/2 \qquad (2.30)$$

the input filter can be left out. This is due to the fact that this circumstance causes the factor $U_1[s - jkw_o N]$ in (2.13) to disappear for values of $k \neq 0$. In practice, the basic frequency of $H(jw)$ is generally small compared with $w_o$, so that the circumstance (2.30) is fulfilled. Thus the entire arrangement in Picture 7 is simplified.

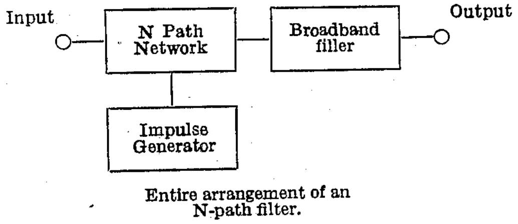

Entire arrangement of an N-path filter.

No particular demands are required at the outlet side of the filter. On one hand, as stated in (2.14), it must suppress the low-frequency spectral portions, on the other hand, it must block only at relatively high frequencies $Nw_o/2$. Such a filter can also be constructed as RC networks in many cases. The impedance of the filter, however, is supposed to be large compared with that of $H(jw)$, so that the N-path network is not subject to overload. Otherwise the derived formulas are not exactly valid. Thus the synthesis of extremely fine discriminating filters is possible without the use of inductor coils.

If several N-path filters have to be switched in cascade, one single pulse generator is sufficient, which provides exact frequency synchronism of the center frequency. The "alignment" of a multi-stage amplifier is effected by mere adjustment of the single pulse-generator frequency to the center of the desired passage range (Picture 8).

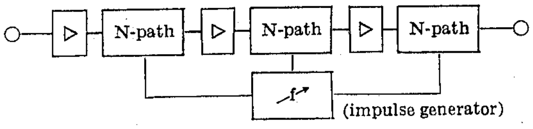

Multi-stage amplifier with N-path filters.

In this manner it is thus simple to tune an amplifier over a larger frequency range, which opens interesting possibilities for the construction of receivers of integrated switching networks.

3. The N-path filter with multi-circuit switches:

The construction of N-path filters with modulators is too expensive for most practical cases.

The equation (2.26) is not sufficient for describing the transformation factor in the case where the modulators $M_{1n}$ and $M_{2n}$ in Picture 2 are replaced by simple multi-circuit switches since the low-pass member $H(jw)$ stores charges even after opening the switch, and thus is not zero with an open switch (compare 2.5). The equation (2.6), however, would illustrate the "short-circuit current amplification," when $u_1(t)$ is replaced by $i_1(t)$ and $u_2(t)$ is replaced by $i_2(t)$, and the outlet is short-circuited.

Another way of consideration is suitable for the derivation of the transformation function, which also takes into account the internal resistance of the current source and the secondary load. The channels of the arrangement according to Picture 2 are somewhat modified in Picture 9.

Picture 9.

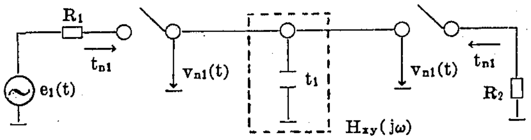

Circuit diagram while taking into account the internal resistance of the signal source.

The open-circuit impedance parameters of the quadrupole $H(jw)$ are called $H_{xy}(jw)$. First $$V_{n1}(j\omega) = H_{11}(j\omega)\cdot I_{n1}(j\omega) + H_{12}(j\omega)\cdot I_{n2}(j\omega)$$
$$V_{n1}(j\omega) = H_{12}(j\omega)\cdot I_{n1}(j\omega) + H_{22}(j\omega)\cdot I_{n2}(j\omega) \qquad (3.1)$$

The currents $I_{n1}$ and $I_{n2}$ are found when the relation (2.9) is applied to $$I_{n1} = \frac{e_1(t) - V_{n1}(t)}{R_1}\cdot p_n(t)$$
$$I_{ng} = \frac{-V_{n2}(t)}{R_2}\cdot q_n(t) \qquad (3.2)$$

$$I_{n1} = \frac{1}{R_1}\sum_{\alpha=-\infty}^{+\infty} P_\alpha \cdot e^{-j\omega_0\alpha(n-j)\frac{\tau}{N}} \times [E_1(j\omega - j\omega_0\alpha) - V_{n1}(j\omega - j\omega_0\alpha)]$$

$$I_{ng} = \frac{1}{R_1}\sum_{\beta=-\infty}^{+\infty} Q_\beta \cdot e^{-j\omega_0\beta(n-j)\frac{\tau}{N}} \cdot V_{ng}(j\omega - j\omega_0\beta) \qquad (3.3)$$

If $H_{xy}(jw)$ is selected so that $H_{xy}(jw) = 0$ for all $|\omega| \geq \omega_o/2$ all members of $V_{n1}$ and $V_{n2}$ will drop with the exception of those for $\alpha = 0$ or $\beta = 0$, thus $$I_{n1} = \frac{1}{R_1}\sum_{\alpha} P_\alpha \cdot e^{-j\omega_0 e(n-j)\frac{\tau}{N}} \times E_1(j\omega - j\omega_0\alpha) - \frac{1}{R_1} p_c \cdot V_{n1}(j\omega)$$

$$I_{n2} = -\frac{1}{R_2} Q_0 V_{n2}(j\omega) \qquad (3.5)$$

This, inserted into the quadrupole equations (3.1) results in $$V_{n1}\left(1 + \frac{H_{11}}{R_1}P_0\right) + V_{n2}\left(\frac{H_{12}}{R_2}Q_0\right) = \frac{H_{11}}{R_1}\sum_\alpha P_\alpha e^{-j\omega_0(n-1)\frac{T}{N}} \cdot E_1(j\omega - j\omega_0\alpha)$$

$$V_{n1}\left(\frac{H_{21}}{R_1}P_0\right) + V_{n2}\left(1 + \frac{H_{22}}{R_2}Q_0\right) = \frac{H_{21}}{R_1}\sum_\alpha P_\alpha e^{-j\omega_0(n-1)\frac{T}{N}} \cdot E_1(j\omega - j\omega_0\alpha) \qquad (3.6)$$

If now the magnitude $V_{n1}$ is eliminated from the pair of equations (3.6), the result will be the following:

$$V_{n2}(j\omega)=\frac{1}{P_0}\cdot\Gamma(j\omega)\cdot\sum_{\alpha} P_\alpha\cdot e^{-j\omega_0\alpha(n-1)\frac{T}{N}}\cdot E_1(j\omega-j\omega_0\alpha) \qquad (3.7)$$

whereby $$\Gamma(j\omega)=\frac{H_{21}+\frac{R_2}{Q_0}}{\left(H_{11}+\frac{R_1}{P_0}\right)\left(H_{22}+\frac{R_2}{Q_0}\right)-H_{12}H_{21}} \qquad (3.8)$$

is a new value whose importance will become clear later. First the output voltage $u_2(t)$ or $u_2(j\,w)$ is to be determined with (2.4).

$$U_2(j\omega)=\sum_{n=1}^{N}\sum_{\beta=-\infty}^{+\infty} Q_\beta\cdot e^{-j\omega_0\beta(n-1)\frac{T}{N}}\times V_{2n}(j\omega-j\omega_0\beta) \qquad (3.9)$$

This expression which has been obtained with the help of the correspondence (2.8), together with (3.7) and (3.8) leads to $$U_2(j\omega)=\sum_{N}\sum_{\alpha}\sum_{\beta}\frac{1}{P_0}\cdot P_\alpha\cdot Q_\beta\cdot e^{-j\omega_0(\alpha+\beta)(n-1)\frac{T}{N}} \times\Gamma(j\omega-j\omega_0\beta)E_1[j\omega-j\omega_0(\alpha+\beta)] \qquad (3.10)$$

an equation which corresponds to the relation (2.10). Taking into account (2.11) and (2.12), the following will be obtained:

$$U_2(j\omega)=\frac{N}{P_0}\sum_{\beta} Q_\beta\cdot\Gamma(j\omega-j\omega_0\beta)\sum_{k} P_{k-\beta}\cdot E_1(j\omega-j\omega_0 kN) \qquad (3.11)$$

and finally, while applying the same band limits as with (2.14), namely:

$$E_1(j\omega)=0 \text{ for all } |\omega|\geqq N\frac{\omega_0}{2}$$

and $$U_2(j\omega)=0 \text{ for all } \beta\neq\pm1$$

$$G(j\omega)=\frac{U_2(j\omega)}{E_1(j\omega)}=\frac{N}{P_0}\times [Q_{+1}P_{-1}\cdot\Gamma(j\omega-j\omega_0)+Q_{-1}P_{+1}\Gamma(j\omega+j\omega_0)] \qquad (3.12)$$

This relation between the output and the input magnitude is constructed similar to (2.15), with the only difference that now the magnitude $\tau(j\,w)$ appears to be transformed instead of the transformation function $H(j\,w)$. The importance of (3.8) thus becomes clear without difficulty. If the switches are controlled synchronously, the equations (2.21) and (2.22) are valid for $P_0$, $P\pm1$, $Q\pm1$, so that the following is obtained as the final formula, analogously to (2.26):

$$G(j\omega)=\frac{U_2(j\omega)}{E_1(j\omega)}=\frac{\sin^2\frac{\pi}{N}}{\left(\frac{\pi}{N}\right)^2}\times[\Gamma(j\omega-j\omega_0)+\Gamma(j\omega+j\omega_0)] \qquad (3.13)$$

If now, as assumed in Picture 9, the quadrupole consists only of a condenser, then the quadrupole parameters are $$H_{11}=\frac{1}{j\omega C} \qquad H_{12}=\frac{1}{j\omega C}$$
$$H_{21}=\frac{1}{j\omega C} \qquad H_{23}=\frac{1}{j\omega C} \qquad (3.14)$$

and, with $P_0=Q_0=1/N$, one will obtain for (3.8):

$$\Gamma(j\omega)=\frac{\frac{1}{j\omega C}NR_2}{\left(\frac{1}{j\omega C}+NR_1\right)\left(-\frac{1}{j\omega C}+NR_2\right)-\frac{1}{\omega^2C^2}} \qquad (3.15)$$

If $R_2>|1/j\,\omega C|$, the expression will change over into:

$$\Gamma(j\omega)\approx\frac{1}{1+j\omega NR_1C} \qquad (3.16)$$

or $$\Gamma(j\omega\pm j\omega_0)\approx\frac{1}{1+(j\omega\pm j\omega_0)NR_1C} \qquad (3.17)$$

The *db* band width results from $$(\omega-\omega_0)NR_1C=1$$

$$B_3=2(\omega-\omega_0)=\frac{2}{NR_1C} \qquad (3.18)$$

The band width thus is inversely proportional to the number of channels which, however, does not mean that a high number of channels is required for narrow-band filters, since a corresponding increase of $R_1$ or C in (3.18) also leads to small band width. An expression which is analogous to (2.24) for the transmission efficiency of the filter as a function of the channel number shows the course which is illustrated in Picture 10.

$$\eta_N=\left(\frac{\sin\frac{\pi}{N}}{\frac{\pi}{N}}\right)^2 \qquad (3.19)$$

Picture 10.

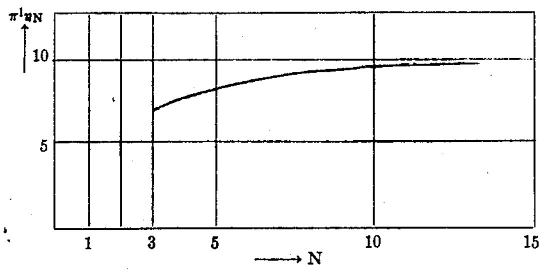

Voltage translation of the N-path varicap filter as function of the channel number N.

With $N > 15$, the following is true: $\eta N \approx\approx 1$, i.e., the output open-circuit voltage in the band center is then about equal to the generator open-circuit voltage - the filter thus would be nearly free of loss. But even with $N=5$, a degree of efficiency of 88 percent would be obtained.

4. Phase-frequency characteristic and group transit time:

If the time succession of a signal is to be transformed without distortion, not only the band width and the amplitude-frequency characteristic must comply with certain demands, as it is known, but also the phase-frequency measure. Hitherto these properties of coilless filters have not been regarded in the literature, but this problem is practically of great importance. The conditions are favorable with N-path filters inasmuch as the phase-and-group -transit-time behavior is similar to a degree with that of common RLC filters.

As the equation (3.13) shows, the frequency dependence of an N-path filter according to Picture 9 is contained in the Γ members, respectively. The expression (3.17) thus is to be taken into account for the calculation of the phase angle $\phi$ as function of the frequency. The following is easily obtained: $\phi(\omega) = \arctan [N R_1 C (\omega - \omega_o)]$(4.1) and therefrom the group transit time $$\tau_0 = \frac{d\varphi(\omega)}{d\omega} = \frac{NR_1C}{1+[NR_1C(\omega-\omega_0)]^2} \quad (4.2)$$

With (3.18) there will result the following at the cut-offs of the transmission range (3 $db$ band width $B_3$):

$$\tau_{03} = \frac{NR_1C}{1+\left[\frac{1}{NR_1C}\cdot NR_1C\right]^2} = \frac{NR_1C}{2} = \frac{1}{B_3} \quad (4.3)$$

If these results are compared with the corresponding values for a simple RLC oscillatory circuit, namely $$\varphi(\omega) = \arctan 2RC(\omega-\omega_0) \quad (4.4)$$

$$\tau_0 = \frac{d\varphi(\omega)}{d\omega} = \frac{2RC}{1+[2RC(\omega-\omega_0)]^2} \quad (4.5)$$

and, for the 3 $dB$ basic frequency $$\tau_{03} = \frac{2RC}{1+\left[2RC\frac{1}{2RC}\right]^2} = RC = \frac{1}{B_3} \quad (4.6)$$

one will obtain even a complete agreement in this case with the same band width. The N-path filter according to Picture 9 is in this respect equivalent to an RLC oscillatory circuit. If, however, the low-pass member $H(jw)$ consists of a multi-member polynominal RC chain or of a "distributed network," the group transit time phase velocity $$\tau_0 = \frac{d \arctan H(i\omega)}{d\omega} \quad (4.7)$$

can vary essentially from that of an RLC filter of equal band width.

5. Circuit variations:

For the realization in integrated techniques, a variable of the digital filter which is shown in Picture 9 is more suitable and which allows very few components and relatively few switches. This arrangement is obtained by re-drawing the circuit which is shown in Picture 9 (Picture 11).

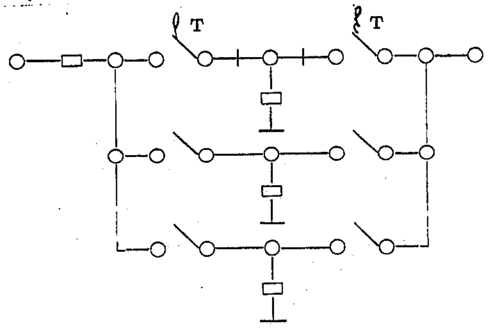

(a) saving of N-1 resistors

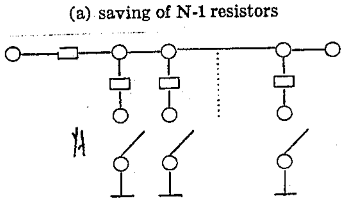
(b) saving of N-1 resistors and N switches

Picture 11: Circuit variations of N-path filters.

Since mechanical switches are impossible for integrated switching networks, electronic means, preferably semiconductors, must be used. In this case, it is particularly advantageous with regard to the production if one of the switch poles lies respectively on ground (Picture 11 $b$)). A diode which, for instance, is biased in blockage direction corresponds to an open switch contact, and a diode which is operated in flow direction corresponds to a closed switch contact. The voltages for switching-over the diodes can thus be put into a relation with ground with the latter circuit which is a simplification. Another decrease of cost is still possible when the condensers and switches are formed in the form of voltage-dependent capacitors and diodes. Such a network then only consists of $N+1$ elements (Picture 13).

Picture 12.

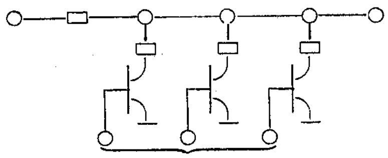
Towards the impulse generator N-path filter with transistor switches.

Picture 13.

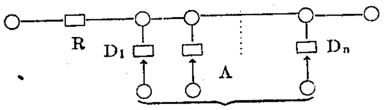

Towards the impulse generator N-path filter with varicaps.

Since the varicaps are advantageously operated in blockage direction, practically no control power is needed. Thus the impulse generator could also be constructed as integrated switching network, for instance, as multivibrator with connected slide register in the thin-film technique (with inserted transistor chips) or in the solid-body thin-film hybrid technique.

The impulse generator probably constitutes the most expensive part of the entire arrangement, but in view of the modern mass production this is not very expensive. These are functional elements already applied in electronic adding machine (ring counters, slide registers). Such circuits, however, are already available as integrated switching networks in various techniques (up to some MHz) in mass production.

Conclusions:

As the mathematical analysis proves, the time-division multiplex method, when suitably applied to RC networks have the same frequency characteristics are are usually obtained with LC filters. The discovery that the tuning frequency of an N-path band pass depends only on the impulse generator and that the damping characteristic once determined in the basic band is recorded absolutely concurrently in the carrier frequency band. Thus tolerances of the individual filter elements do affect the shape of the transformation curve, but not its tuning position. The same is true for the constancy of the elements. Due to these properties, N-path filters are most suitable for integrated switching networks at frequencies up to about 2 MHz, of all heretofore known coil-less electric filters.

APPENDIX 1

$$P_n(t)=\sum_\alpha P_\alpha e^{j\omega_0\alpha(t-(n-1)\tau)}=\sum_\alpha P_\alpha\cdot e^{j\omega_0\alpha t}\times e^{-j\omega_0\alpha(n-t)\tau}$$

$$P_n(s)=\sum_\alpha P_n\cdot e^{-j\omega_0\alpha(n-t).\tau t}\cdot\frac{1}{g=j\omega_0\alpha}.$$

With (1.11) and (1.12), one finds for:

$$U_1(s)\otimes P_n(s)=\sum_\alpha P_n\cdot e^{-j\omega_0\alpha(n-1)\tau}.1\cdot U_1(s-j\omega_0\alpha)$$

since the derivation of the nominator of $1/(s-j\,\omega_o\,\alpha)$ after $s$ results in $d(s-j\,\omega_o\,\alpha)/ds=1$, and the single zero position is $s_r=j\,w_0\alpha$. This result in this case might have been also derived from the displacement law (1.7) directly, since:

$$\beta\{u_1(t)\cdot p_n(t)\}=\beta\{u_1(t)\cdot\sum_\alpha P_\alpha e^{j\omega_0\alpha t-j\omega_0\alpha(n-1)\tau}\}$$

$$=\sum_\alpha P_\alpha e^{-j\omega_0\alpha(n-1)\tau}.\beta\{u_1(t)\cdot e^{j\omega_0\alpha t}\}$$

$$=\sum_\alpha P_\alpha e^{-j\omega_0\alpha(n-1)\tau}.U_1(s-j\omega_1\alpha).$$

APPENDIX 2

$$\sum_N e^{-j\omega_0(n-1)(\alpha+\beta)\tau}$$

is the sum of a geometric set with the quotient $$q=e^{-j\omega_0(\alpha+\beta)\tau}$$

Thus:

$$\sum_N e^{-j\omega_0(n-1)(\alpha+\beta)\tau}=\frac{q^{N-1}}{q^{-1}}=\frac{e^{-j\omega_0(\alpha+\beta)\tau.N}-1}{e^{-j\omega_0(\alpha+\beta)\tau}-1}.$$

With $$\omega_0=\frac{2\pi}{T}\text{ and }\tau=\frac{T}{N},$$

this becomes:

$$\sum_N=\frac{e^{-j2\kappa(\alpha+\beta)}-1}{e^{-j2\kappa\frac{\alpha+\beta}{N}}-1}$$

for all $\alpha+\beta=$ integer.

But, if also $(\alpha+\beta)/N=$ integer, then the expression is an undetermined form of the type 0/0. The demarcation value of the fraction:

$$\lim\frac{e^{-j2\kappa(\alpha+\beta)}-1}{e^{-j2\kappa\frac{\alpha+\beta}{N}}-1}=\lim\frac{N\cdot e^{-j2\kappa(\alpha+\beta)}}{e^{-j2\kappa\frac{\alpha+\beta}{N}}}=N\,\frac{\alpha+\beta}{N}\rightarrow k$$

can be found with the help of the rule of d'Hospital. The $$\sum_N$$

has a finite value only for those $\alpha+\beta$ which are an integral multiple ($k=$ integral) of N. For all others it is equal to zero.

Appendix 3

With p (t) from (2.19), $$p_\alpha=\frac{j}{T}\int_0^8 p(t)\cdot e^{-j\omega_0 \circ t}dt=\frac{A}{T}\int_0^8 e^{-1\frac{2\pi\alpha}{T}}d.$$

$$=\frac{j}{2\pi\alpha}\left[e^{-1\frac{2\pi\alpha}{N}}-1\right]$$

$$=\frac{j}{2\pi\alpha}e^{-1\frac{\pi\alpha}{N}}\left[e^{-1\frac{\pi\alpha}{N}}-e^{+1\frac{\pi\alpha}{N}}\right]$$

$$=e^{-1\frac{\pi\alpha}{N}}\cdot\frac{sin\,\frac{x\alpha}{N}}{\pi\alpha}\text{ with }\omega_0=\frac{2\pi}{T}$$

$$\tau=\frac{T}{N}\text{ and }ahjx=j\text{ sin }x.$$

Bibliography

[1] W. K. Linvill: The Use of Sampled Functions for Time-Domain Syntheses, Proc. Nat. Electr. Conf. Chicago 1953 Vol. 9.

[2] W. R. LePage, C. R. Cahn & J. S. Brown: Analysis of a Comb-Filter Using Synchronously Commutated Capacitors, A.I.E.E. Trans., Part 1/72 (1953).

[3] L.E.Franks & I.W.Sandberg: An Alternative Approach to the Realization of Network Transfer Functions: The N-Path Filter. BSTJ Sept. 1960.

[4] Motorola Integrated Circuit Course, Paris, April 1965: Digitalized RC-Filters.

[5] G. Doetsch: Introduction Into The Theory and Application of the Laplace transformation.

[6] G. Doetsh: Guideline for a Practical Usage of the Laplace Transformation.

[7] E.Langer & V. Risak: Stereophone Broddcast - A Discussion of the Technical Possibilities. Austrian Radio View,IssuesNo. 9, 10 & 11/1961.

[8] V. Fetzer: Connection Betwen Time Function and Frequency Function. A.E.U. Vol. 8/1954, pages 163-172.

SUMMARY OF THE INVENTION

The present invention utilizes the characteristics of N-Path filters to accomplish a frequency transformation upwardly or downwardly and frequency selection. Thus, for receivers such as AM/FM radio receivers generally it is necessary to have two different intermediate frequency stages. For the AM range a relatively low intermediate frequency is used because the small channel band width (9kHz) and the desired adjacent channel rejection (40*db*) can be accomplished at relatively low cost with two pass band filters. For reception in the FM frequency range, the frequency deviations of plus and minus 75 kHz and the image frequency rejection requires relatively higher intermediate frequencies. Thus for FM receivers an intermediate frequency of 10.7, 8.25 or 6.75 MHz is generally utilized. Stations must be spaced 300 kHz apart due to the band width of the FM channel. To select a particular FM station and reject adjacent channels the selection is to be accomplished with at least 6 to 8 stages. In order to improve adjacent channel rejection double superposition is used and a low intermediate frequency is selected (for example 1.65 MHz). Double superposition circuits of this type have been used in commercial receivers for a long time.

Receivers which are constructed with integrated circuits do not use inductors and selectivity must be accomplished with filters which do not contain inductance. Generally active RC filters are utilized but until the present time good selectivity has been accomplished only in the frequency range below 2 Mhz. This has required that AM/FM radio receivers utilize double superposition. The first intermediate frequency has relatively little selectivity because it is used only for the suppression of image frequencies. For this purpose RC filters may be used at relatively high frequencies.

To obtain the required channel rejection of adjacent channels a second IF frequency with a center frequency at about 1.65 MHz has been used. To convert the frequency from the first to the second frequency generally a second mixer stage and a second oscillator have been required.

In the present invention the properties of N-Path filters are used for frequency conversion upwardly or downwardly in electronic receivers.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a block diagram illustrating an N-Path filter which makes a frequency conversion;

FIG. 2 is a block diagram illustrating an N-Path filter which produces a plurality of outputs, and FIG. 3 is a block diagram of a radio receiver which utilizes an N-Path filter.

DESCRIPTION OF THE PREFERRED EMBODIMENTS

FIG. 1 illustrates an input terminal E to which a frequency $f_1$ is supplied. This frequency is supplied to an N-Path filter 1, which receives an input from an impulse generator 2. A band pass filter 3 is connected to the output of the N-Path filter 1 and passes a frequency $f_2$ to an output terminal A. The arrangement of FIG. 1 may be used, for example, as a second intermediate frequency stage in a double superhetrodyne receiver. The impulse generator 2 has a switching or impulse frequency of $f_o$ and if this frequency is approximately equal to an integral fraction of the frequency $f_1$ of the input signal, a lower frequency $f_2$ can be filtered out as the second intermediate frequency. The band pass filter 3 has a center frequency of $F_2$ in this example. Thus, the N-Path filter in combination with the band pass filter 3 operates as a downward frequency converter and band pass filter.

Another embodiment of the invention is illustrated in FIG. 2 in which three outputs $f_2'$, $f_2''$ and $f_2(n)$ are produced at output terminals A1, A2 and A3. The output of the N-Path filter 1 is connected to the inputs of band pass filters 21, 22, 23 which have pass bands of $f_2'$, $f_2''$ and $f_2^{(n)}$, respectively. The signals at the output terminals A1, A2 and A3 will be lower than the input frequency $f_1$ by an integral factor.

Third embodiment of the invention illustrated in FIG. 3. A first antenna detects a signal $f_1$ and supplies it to a tuner 31 which produces an output ZF1 and supplies it to an I.F. stage 33. The I. F. stage 33 supplies a signal ZF1 to a first terminal of a switch S. In a first position of the switch S, I. F. amplifier stage 33 is connected to N-Path filter 1. A band pass filter 35 is connected to the output of N-Path filter 1 and an output terminal A is connected to the output of the band pass filter 35. With the switch S in the position shown in FIG. 3 the receiver operates in the VHF range and the N-Path filter and band pass filter 35 operate as a selective frequency converter to transpose the signal $ZF_1$ to a lower frequency $ZF_2$.

A second tuning range may be obtained with the second antenna which receives a signal $F_1'$ and supplies it to the tuner 32. The output of the tuner 32 is ZF2 which is supplied to an amplifier 34. When the switch S is in a second position it contacts the output of the amplifier 34 and supplies it to the input of the N-Path filter 1. When the switch S passes the output of the amplifier 34, the signal $ZF_2$ passes through the N-Path filter and the band pass filter 35 without a frequency conversion.

It is to be noted that in both positions of the switch S the band pass filter 35 is tuned to the second intermediate frequency $ZF_2$.

It is to be particular noted that the frequency conversion is made without the use of a second oscillator or mixer stage which is normally required in a double conversion superhetrodyne receiver.

Thus, the arrangement allows a frequency ZF2 to be obtained at the output of band pass filter 35 for both positions of switch S. When the switch is connected to amplifier 34 no frequency conversion occurs but when the switch is connected to I. F. stage 33 the frequency ZF1 is converted to ZF2 at the output of band pass filter 35.

It is seen that this invention utilizes an N-Path filter in combination with the receiver components to eliminate second oscillators and mixers generally used.

Although minor modification might be suggested by those versed in the art, it should be understood that we wish to embody within the scope of the patent warranted hereon all such modifications as reasonable and properly come within the scope of our contribution to the art.

I claim:

1. A double super heterodyne receiver arrangement for receiving a plurality of frequency bands, said radio receiver comprising:
   - a first frequency band receiving channel including an intermediate frequency stage;
   - a second frequency band receiving channel;
     - an N-path filter means operating as a second intermediate frequency stage further comprising:
     - a. an N-path input lead;
     - b. an N position switching means connected to said input and having an output;

c. N low pass filters connected to each of said N position switching means outputs;

d. a second N position switching means connected to said N low pass filters, said second switching means switching said N low pass filter outputs to one output path, said output path being the output lead of said N-path filter;

e. an impulse generator means for causing said switching means to scan said N-paths, the frequency of said impulse generator means being equal to a lower harmonic of the center frequency of the received frequency bands of the receiver arrangement;

a switching means connected to said N-path filter input lead for switching between the said first and second frequency band receiving channels; and a band pass filter means connected to the output lead of said N-path filter.

2. A receiver according to claim 1 wherein said band pass filter means has a pass band which is an integral fraction for a multiple of the received frequency bands.

3. A receiver according to claim 1 further including a second band pass filter means connected to the output lead of said N-path filter.

* * * * *